United States Patent [19]
Jones, Jr.

[11] 3,854,581
[45] Dec. 17, 1974

[54] PRESSURE-SENSITIVE MATERIAL AND SUPPORTING MATERIAL COMBINATION

[75] Inventor: Ernest Charles Jones, Jr., Franklin, Ohio

[73] Assignee: Monarch Marking Systems, Inc., Dayton, Ohio

[22] Filed: Apr. 10, 1972

[21] Appl. No.: 242,465

[52] U.S. Cl. ............ 206/460, 40/2.2, 161/36, 161/160, 161/167, 161/402, 161/406, 161/413, 206/447, 206/459, 206/526, 206/820, 260/2.5 HA, 264/288, 283/21
[51] Int. Cl. ............ B32b 5/18, G09f 3/00
[58] Field of Search ......... 161/36, 38, 247, 39, 402, 161/167, 406, 413, 159, 160; 156/71; 40/2 R; 283/18, 21; 117/7, 68.5, 76 A, 122 PF; 264/DIG. 16, 288; 260/2.5 HA; 206/447, 459, 460, 526

[56] References Cited
UNITED STATES PATENTS

| | | | |
|---|---|---|---|
| 2,246,984 | 6/1941 | Palmer | 161/36 X |
| 2,508,855 | 5/1950 | Brown | 161/73 |
| 2,657,795 | 11/1953 | Calabrese | 161/36 X |
| 2,767,435 | 10/1956 | Alles | 264/288 |
| 2,956,703 | 10/1960 | Royal | 117/76 A |
| 2,998,324 | 8/1961 | Hirt | 117/47 A |
| 3,006,793 | 10/1961 | Wheeler III | 161/406 X |
| 3,035,957 | 5/1962 | Morgan | 161/411 X |
| 3,396,837 | 8/1968 | Schmelzle | 117/122 PF |
| 3,415,714 | 12/1968 | Hider | 161/161 |
| 3,422,172 | 5/1973 | Dekker | 264/288 |
| 3,461,198 | 8/1969 | Ryan et al | 264/288 X |
| 3,499,819 | 3/1970 | Lewis | 161/161 |
| 3,536,797 | 10/1970 | Cowan et al. | 264/51 |
| 3,677,980 | 7/1972 | Last | 260/2.5 HA |
| 3,732,122 | 5/1973 | Fehrn-Christensen | 117/7 X |
| 3,793,239 | 2/1974 | Rixon et al. | 260/2.5 HA |

*Primary Examiner*—George F. Lesmes
*Assistant Examiner*—Henry F. Epstein
*Attorney, Agent, or Firm*—Joseph J. Grass

[57] ABSTRACT

There is disclosed a pressure-sensitive material and supporting material combination having a tape or label comprised of extruded, foamed, stretched, uniaxially oriented, adhesive-backed polyolefin material which is both decorative and provides a telltale indication of tampering if attempted to be removed. The polyolefin material is releasably adhered to supporting material from which the polyolefin material can be stripped prior to use. The polyolefin material, such as polypropylene, is formed into labels by means of cuts, and is coated or treated to increase its printability.

There is also disclosed a pressure-sensitive material and supporting material combination which includes supporting material comprised of extruded, foamed, stretched, uniaxially oriented polyolefin film which tears readily in the axial direction at any transverse location so that any selected width of the supporting material can be stripped from the pressure-sensitive material. In this manner only the adhesive on the pressure-sensitive material from which supporting material has been stripped away is exposed. The pressure-sensitive material can be adhered to a surface by means of the exposed adhesive. In one embodiment the invention is applied to a label construction, and in another embodiment the invention is applied to a wall covering construction. Also disclosed is method of using and applying this combination.

4 Claims, 11 Drawing Figures

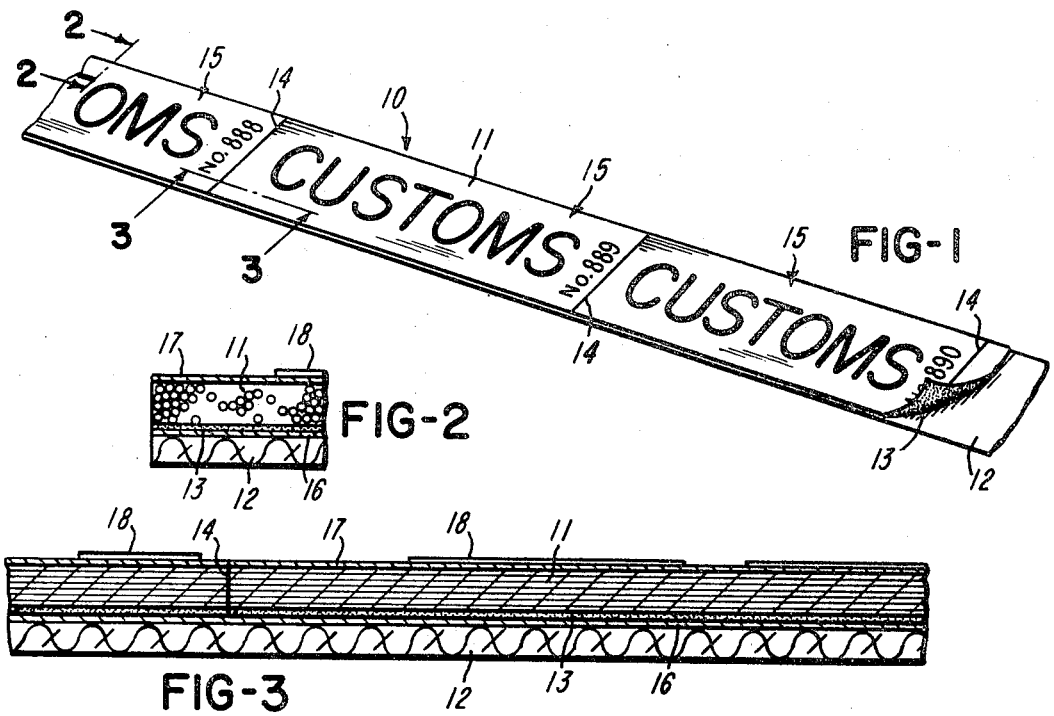
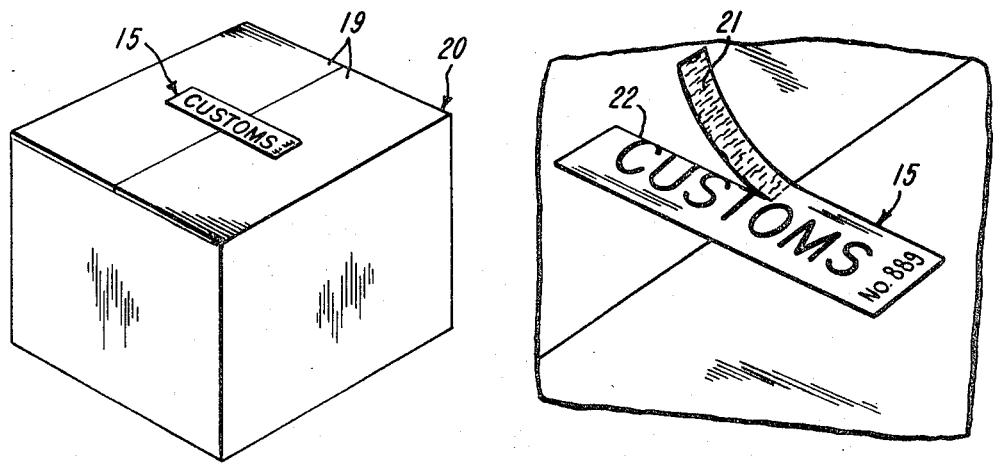

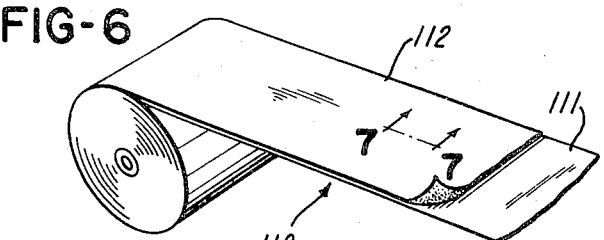
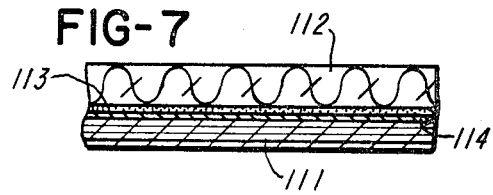
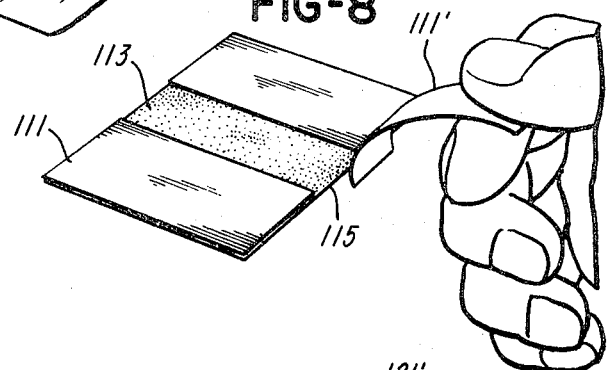
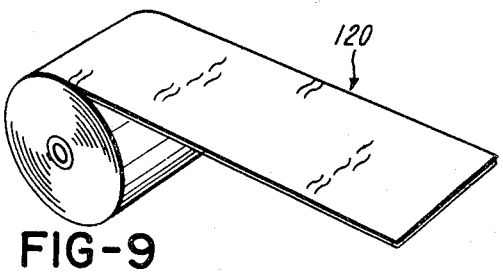
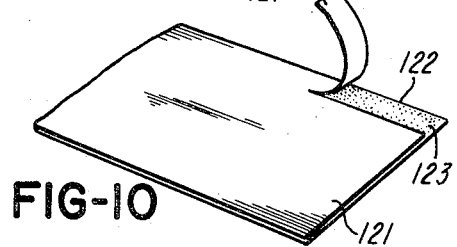
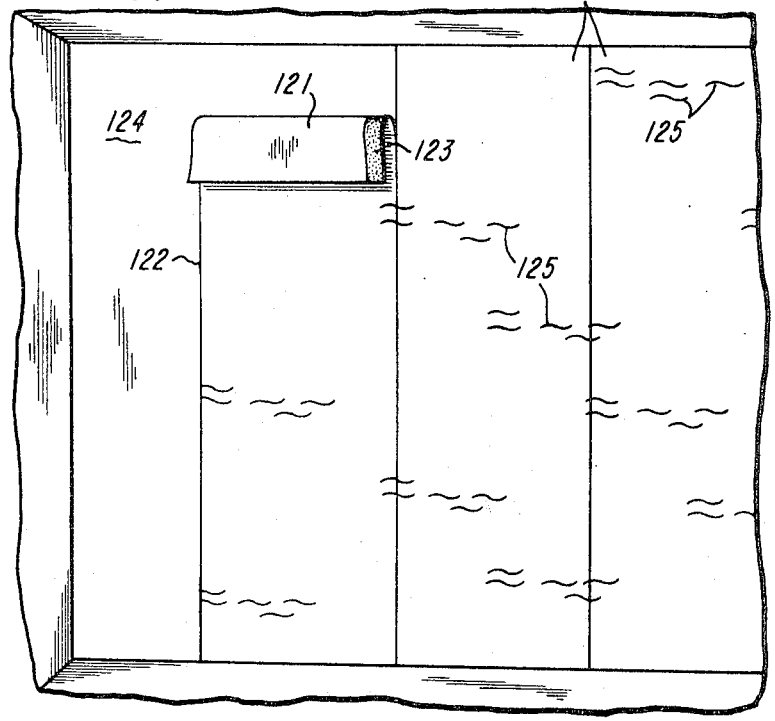

PRESSURE-SENSITIVE MATERIAL AND SUPPORTING MATERIAL COMBINATION

BACKGROUND OF THE INVENTION

1. Field of the Invention

This invention relates to the art of pressuresensitive materials and to the art of using and applying pressure-sensitive materials.

2. Description of the Prior Art

Foamed polyolefin film or ribbon material is disclosed, for example, in U.S. Pat. No. 3,536,797 to Cowan et al. Such foamed materials are stretched to impart uniaxial orientation thereto. The resultant material has a high gloss which is particularly esthetically desirable. U.S. Pat. No. 2,767,435 to Alles relates to the longitudinal stretching of polymeric film. U.S. Pat. No. 2,998,324 to Hirt discloses methods for treating polypropylene.

It is common practice in the prior art to cut or otherwise weaken the supporting material for pressure-sensitive material so that the supporting material can be more easily stripped from the pressure-sensitive material, as illustrated, for example, in U.S. Pat. Nos. 2,246,984; 3,006,793; and 3,035,957.

SUMMARY OF THE INVENTION

The invention comprises tapes or labels that are constructed of foamed, stretched, uniaxially oriented polyolefin film material which has a coating of pressure-sensitive adhesive on its underside. The foaming and stretching contribute substantially to the high gloss decorative appearance of the film material and provide a telltale indication of tampering if attempted to be removed. As the film is weak in the longitudinal direction it tears easily if attempted to be removed. In addition, as the adhesive resists any attempt to strip the material from the surface of the article to which it is applied, the material wrinkles permanently and noticeably upon being stripped from the surface. Accordingly, the tape or label of the invention is particularly useful as a tamperindicating device. It is preferred to use polypropylene as the polyolefin in that it has excellent characteristics for the above described purposes. It is also preferred to provide the tape or label material with a backing or supporting material to which pressure-sensitive adhesive is releasably adhered until it is ready to be used. The polyolefin, particularly in the case of the preferred polypropylene, is coated or treated to augment its printability.

The invention also comprises constructing supporting material of a material which will tear readily in an axial direction at any location so that any related width of supporting material can be stripped from the associated pressure-sensitive, adhesive-backed material. Wherever the supporting material has been stripped away from the pressure-sensitive material, the adhesive on the pressure-sensitive material is exposed, and the exposed adhesive can adhere the pressure-sensitive material to a surface. The invention is particularly useful when applied to material which is to be adhered to a surface by exposing only a portion of the adhesive on the underside of the pressure-sensitive material. One specific application is a label or badge as is worn on the lapel of a suit or on other clothing at conventions, meetings and the like to identify the wearer. In accordance with the method of the invention, only a selected width of the supporting material is stripped away to expose a strip of adhesive on the underside of the pressure-sensitive material, and thereupon the label or badge is applied to the clothing. If it is desired to remove and reapply the label at a later time, additional supporting material can be stripped away prior to reapplication of the label. Another specific application is a wall covering construction in which, according to the method of the invention, any selected width of supporting material is removed so that the wall covering can be positioned and adhered to a surface along a small strip of the wall covering material by means of the exposed adhesive and thereafter additional supporting material can be removed to expose additional adhesive to adhere an additional strip of the wall covering material to the surface.

BRIEF DESCRIPTION OF THE DRAWINGS

FIG. 1 is a perspective view of a pressure-sensitive label construction in accordance with the invention;

FIG. 2 is a sectional view taken in a direction transverse to the direction of axial orientation, that is, generally along line 2—2 of FIG. 1;

FIG. 3 is a sectional view taken in the direction of axial orientation, that is, generally along line 3—3 of FIG. 1;

FIG. 4 is a perspective view showing one use of the invention as a tamper-indicating seal or label;

FIG. 5 is an enlarged perspective view showing the results of attempted removal of the seal or label;

FIG. 6 is a perspective view of a pressure-sensitive material and supporting material combination in accordance with another embodiment of the invention;

FIG. 7 is a sectional view taken in the axial or longitudinal direction along line 7—7 of FIG. 6;

FIG. 8 is a perspective view of the underside of a label and its supporting material made from the combination disclosed in FIGS. 6 and 7, with part of the supporting material shown as having been stripped away prior to application of the label to a surface by means of the exposed adhesive;

FIG. 9 is a perspective view of a roll of wall covering material in accordance with another embodiment of the invention;

FIG. 10 is a perspective view of a fragmentary portion of the roll shown in FIG. 9, showing a strip of a selected width of the supporting material partially removed; and FIG. 11 is a perspective view of part of a room, illustrating one of the steps of the method by which the wall covering is applied.

DETAILED DESCRIPTION OF THE PREFERRED EMBODIMENTS

With reference to FIG. 1, there is illustrated a pressure-sensitive label construction generally indicated at 10, which is shown to include label material 11 releasably adhered to a web of supporting material 12 by a coating of pressure-sensitive adhesive 13. Longitudinally spaced-apart cuts 14 extend through the label material 11 from side edge to side edge of the web to define the webs of the labels 15. As shown, the side edges of the web of label material 11 and the web of supporting material 12 are preferably straight and coextensive. It is preferred that the film which comprises the pressure-sensitive material 11 be between about 0.002 and 0.010 inch thick and in one specific embodiment of the invention the film 11 is about 0.005 inch thick. The label material 11 is comprised of a foamed, stretched, uniaxially oriented polyolefin film. It is preferred that the polyolefin be polypropylene. When a label has been applied to the surface of an article, the material wrinkles permanently and noticeably transverse to the direction of orientation upon being stripped from the surface, and additionally the label material is weak and readily fractures in the direction of orientation. In addition, the label 15 itself is decorative in appearance and consequently finds a variety of applications.

With reference to FIGS. 2 and 3, the materials which comprise the pressure-sensitive label construction are shown in greater detail. The supporting material 12 can be comprised of commercially available known materials such as glassine or parchment. A conventional release-coating of a silicone material 16 is provided on the surface of the supporting material 12. The pressure-sensitive adhesive 13 which is adhered to the polyolefin film material 11 can be readily stripped from the supporting material 12 because of the release-coating 16. The exposed or upper surface of the film 11 can be treated to increase or augment the printability of the film 11. Commercially known methods disclosed in the literature and in U.S. Pat. No. 2,998,324 include heat and flame treatment, treatment with ozone, a gaseous halogen and/or ultraviolet light; electronic treatment (corona discharge); and chemical treatment with sulphuric acid and dichromate. The results of the surface treatment or coating are indicated by a third layer 17 and the ink resulting from printing on the treated or coated surface 17 is indicated at 18.

With reference to FIG. 4, a lable 15 is shown to be applied across flaps 19 of a container 20 to serve as a tamper-indicating label or seal. An attempt to remove the seal or label will cause the film material to wrinkle as indicated by transverse wavy lines 21 in FIG. 5, thereby indicating that it has been removed. The film material 11 is also readily fracturable in the axial direction and to illustrate this, the film material is shown in FIG. 5 to be tearing along a line 22. Accordingly, the film material 11 is highly susceptable to permanent indication of tampering by the cracks which run transversely to the direction of axial orientation of the film 11 upon attempted removal from the article to which it has been applied. The film material 11 is highly susceptable to permanent indication of tampering by one or more fractures in the axial direction upon attempted removal. The telltale indications due to either one or both the fracturing and the wrinkling are visably evident even though the label is reapplied to an article.

Referring to the embodiment of FIGS. 6 through 8, there is shown a pressure-sensitive material and supporting material combination 110 comprising a web of supporting material 11 serving as a carrier for pressure-sensitive material 112. In this illustrated embodiment the pressure-sensitive material comprises label material which can be printed with any suitable indicia. The label material 112 includes a coating of pressure-sensitive adhesive 113 on its underside. The adhesive 113 releasably adheres the label material 112 to the supporting material 111. The supporting material has a conventional silicone release-coating 114 or other coating to allow the supporting material 111 to be easily stripped away from the label material 112.

The supporting material 111 is comprised of a foamed, stretched, uniaxially oriented polyolefin film. The axial direction extends in the longitudinal direction of the web which comprises the combination 110. It is preferred that the polyolefin be polypropylene. This film has the characteristic of being readily fracturable in the axial direction, and this feature enables any selected width of the supporting material to be stripped away from the label material 112 to expose a strip of the adhesive 113 on the label material. Labels can be formed by cutting transversely through the supporting material 111 and the pressure-sensitive material 112 at spaced apart locations lengthwise of the combination 110. A label 115 with a strip 111' of a selected width of the supporting material 111 stripped away in the axial direction is shown in FIG. 8. The exposed adhesive 113 on the underside of the label 115 can be used to adhere the label 115 to any suitable surface. It is apparent that the fact the film which comprises the supporting material 111 fractures or tears readily at any transverse location in the axial direction, the strip 111' can be of any selected width.

With reference to the embodiment of FIGS. 9 through 11, there is disclosed a pressure-sensitive material and supporting material combination 120 comprising a web of supporting material 121 serving as a carrier for pressure-sensitive material 122. In this illustrated embodiment the pressure-sensitive material comprises wall covering material referred to generally in the art as wallpaper, but can be constructed using a variety of materials other than paper, vinyl, and other plastics, cloth, grass-covered materials, and the like. The wall covering material can be coated or printed with suitable colors and decorative designs 125 as is conventional. The pressure-sensitive material 122 includes a coating of pressure-sensitive adhesive 123 releasably adhering the material 122 to the supporting material 121, and as in the embodiment of FIGS. 6 through 8 the supporting material 121 carries a silicone release-coating. The supporting material 121 is comprised of the same material as the supporting material of the embodiment of FIGS. 6 through 8, which is capable of being stripped away from the pressure-sensitive material 122 in strips of any selected width. It is preferred to have the axial orientation be the longitudinal direction of the web which comprises the roll. As shown in FIG. 10, a strip 121' of the supporting material 121 has been partially stripped away from the wall covering material 122, thereby exposing a strip of the adhesive 123 on the wall covering material 122. According to the method of the invention, once the selected width of supporting material 121 has been stripped away by tearing in the axial direction, the wall covering material 122 with part of the supporting material 121 still adhered to it is positioned and adhered to a surface such as a wall 124 by means of the exposed adhesive 123. Now that the wall covering has been positioned in accurate alignment relative to the other wall covering 122, additional supporting material 121 can be stripped away to expose additional adhesive 123, and thereupon the additional exposed wall covering material is adhered to the wall by means of the additional exposed adhesive 123. Accordingly, by stripping away any selected width or widths of the supporting material 121 in two or more stages the wall covering can be easily applied without having to contend with wall covering material with more adhesive exposed than is desired for optimum ease of application.

In the embodiments of FIGS. 6 through 8 and 9 through 11, the supporting material 111 and 121 respectively is comprised of polyolefin film and preferably polypropylene film of preferably between about 0.002 to about 0.010 inch thick but more typically about 0.005 inch thick.

By way of example, not limitation, typical values for one 5.0 mil thick polypropylene film useful for the label material 11 in the embodiment of FIGS. 1 through 5, and for the supporting material 111 and 121 in the respective embodiments of FIGS. 6 through 8 and 9 through 11, are as follows:

```
Basis Weight — (24 × 36 — 500) —44.3 LBS./REAM
Thickness — 5.0 Mils
Density — 0.568 gms./cc
Yield — 9750. sq. in./lb.
Instron Tensile — CD — 900 psi
Instron Tensile — MD — 13,400 psi
Instron Elongation — CD — 5%
Instron Elongation — MD — 25%
Elmendorf Tear — MD — 23.0 gms.
Smoothness (Sheffield) — 20.0
Opacity — 46%
Stiffness — MD/CD — 1.5/0.4 Tabor
W.V.T.R. — 1.51 gms./24 hr./100 sq. in./Mil
  Gas Transmission, cc/24 hrs./100 sq. in./Mil
    at 1 Atm. Differential
    O₂         460cc
    N₂         100cc
    Air        150cc
Stick Point,   329°F
```

This film is commercially available from H. P. Smith, Subsidiary of Phillips Petroleum Company, Chicago, Illinois 60638, U.S.A., and is described in a brochure entitled TYPICAL VALUES — FOAMED POLYPROPYLENE dated June 15, 1971.

The above expression "MD" as used in the art denotes "machine direction" which has the same meaning as "axial direction" as used in this application, and the expression "CD" as used in the art denotes "cross direction" which has the same meaning as "transverse direction" as used in this application.

Other embodiments and modifications of the invention will suggest themselves to those skilled in the art, and all such of these as come within the spirit of this invention are included within its scope as best defined by the appended claims.

I claim:

1. A tamper-indicating label construction, comprising: a longitudinally extending web of supporting material, label material having a coating of pressure-sensitive adhesive releasably securing the label material to the supporting material, and cuts through the label material at longitudinally spaced apart intervals defining labels, the label material comprising extruded, foamed, stretched, uniaxially oriented polyolefin film which tears readily longitudinally and wrinkles transversely, wherein the polyolefin film comprises polypropylene, the labels being capable of being removed from the supporting material and applied to articles but providing a telltale indication of tampering by tearing longitudinally and/or by wrinkling transversely if attempted to be removed.

2. A tamper-indicating label construction, comprising: a longitudinally extending web of supporting material, label material having a coating of pressure-sensitive adhesive releasably securing the label material to the supporting material, cuts through the label material at longitudinally spaced apart intervals defining labels, the label material comprising extruded, foamed, stretched, uniaxially oriented polyolefin film which tears readily longitudinally and wrinkles transversely, wherein the polyolefin film comprises polypropylene, the labels being capable of being removed from the supporting material and applied to articles but providing a telltale indication of tampering by tearing longitudinally and/or by wrinkling transversely if attempted to be removed, means for augmenting the printability of the film, and printed indicia carried by the labels.

3. A tamper-indicating label construction, comprising: a longitudinally extending web of supporting material, label material having a coating of pressure-sensitive adhesive releasably securing the label material to the supporting material, and cuts through the label material at longitudinally spaced apart intervals defining labels, the label material comprising extruded, foamed, stretched, uniaxially oriented polyolefin film whch tears readily longitudinally and wrinkles transversely, wherein the polyolefin film comprises polypropylene, wherein the thickness of the film is between about 0.02 and 0.010 of an inch, the labels being capable of being removed from the supporting material and applied to articles but providing a teletale indication of tampering by tearing longitudinally and/or by wrinkling transversely if attempted to be removed.

4. A tamper-indicating label construction, comprising: a longitudinally extending web of supporting material, label material having a coating of pressure-sensitive adhesive releasably securing the label material to the supporting material, wherein the label material and the supporting material have straight side edges and the cuts are across the entire width of the label material from side edge to side edge, and cuts through the label material at longitudinally spaced apart intervals defining labels, the label material comprising extruded, foamed, stretched, uniaxially oriented polyolefin film which tears readily longitudinally and wrinkles transversely, wherein the polyolefin film comprises polypropylene, the labels being capable of being removed from the supporting material and applied to articles but providing a telltale indication of tampering by tearing longitudinally and/or by wrinkling transversely if attempted to be removed.

* * * * *